(12) United States Patent
Li

(10) Patent No.: US 7,266,086 B2
(45) Date of Patent: Sep. 4, 2007

(54) ARQ PARAMETER NEGOTIATION IN A DATA PACKET TRANSMISSION SYSTEM USING LINK ADAPTATION

(75) Inventor: Hui Li, Nürnberg (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1034 days.

(21) Appl. No.: 10/239,035

(22) PCT Filed: Mar. 13, 2001

(86) PCT No.: PCT/EP01/02774

§ 371 (c)(1),
(2), (4) Date: Dec. 19, 2002

(87) PCT Pub. No.: WO01/71964

PCT Pub. Date: Sep. 27, 2001

(65) Prior Publication Data

US 2003/0092464 A1    May 15, 2003

(30) Foreign Application Priority Data

Mar. 20, 2000   (EP) ............................... 00105836

(51) Int. Cl.
*H04L 12/26* (2006.01)

(52) U.S. Cl. .................................................. 370/252

(58) Field of Classification Search ............. 370/252, 370/345, 465, 310, 412, 410, 413, 395.21, 370/419, 233
See application file for complete search history.

(56) References Cited

U.S. PATENT DOCUMENTS

| | | | | |
|---|---|---|---|---|
| 4,697,281 A | * | 9/1987 | O'Sullivan | 455/557 |
| 5,526,399 A | | 6/1996 | Kameda | 379/58 |
| 5,577,046 A | * | 11/1996 | Diachina et al. | 370/252 |
| 5,954,839 A | * | 9/1999 | Park et al. | 714/699 |
| 6,208,663 B1 | * | 3/2001 | Schramm et al. | 370/465 |
| 2001/0056560 A1 | * | 12/2001 | Khan et al. | 714/746 |

FOREIGN PATENT DOCUMENTS

WO    WO99/12304    3/1999

OTHER PUBLICATIONS

Jamshid Khun-Jush et al., "Structure and Performance of the HIPERLAN/2 Physical Layre", Gateway to 21st Century Communications Village, VIC 1999-Fall, IEEE VTS 50th Vehicular Technology Conference, XP-002143134, pp. 2667-2671.
Hayashida, Y. et al., "Stop-and Selective Repeat ARQ Scheme for A High-Speed Transport Protocol", Proceedings of IEEE Singapore International Conference On Networks/International Conference On Information Engineering 1995, XP-002143133, pp. 101-105.

* cited by examiner

*Primary Examiner*—Seema S. Rao
*Assistant Examiner*—Lawrence J. Burrows
(74) *Attorney, Agent, or Firm*—Roger S. Burleigh

(57) ABSTRACT

A method for transmitting data packets between a transmitter and a receiver unit in a communication system is described. For transmitting data packets a transmission mode is selected from a plurality of available transmission modes and an automatic repeat request for retransmission is used. Therefore for each available transmission mode a channel parameter based on link quality is calculated and a transmission capacity parameter is determinated. The state of the automatic repeat request control window for at least one transceiver is identified. For each available transmission mode an estimation of the user quality value based on the channel parameter, the transmission capacity parameter and the state of the automatic repeat request control window from at least one transceiver is estimated. The transmission mode that provides the best user quality value is selected.

11 Claims, 6 Drawing Sheets

Figure 3A:
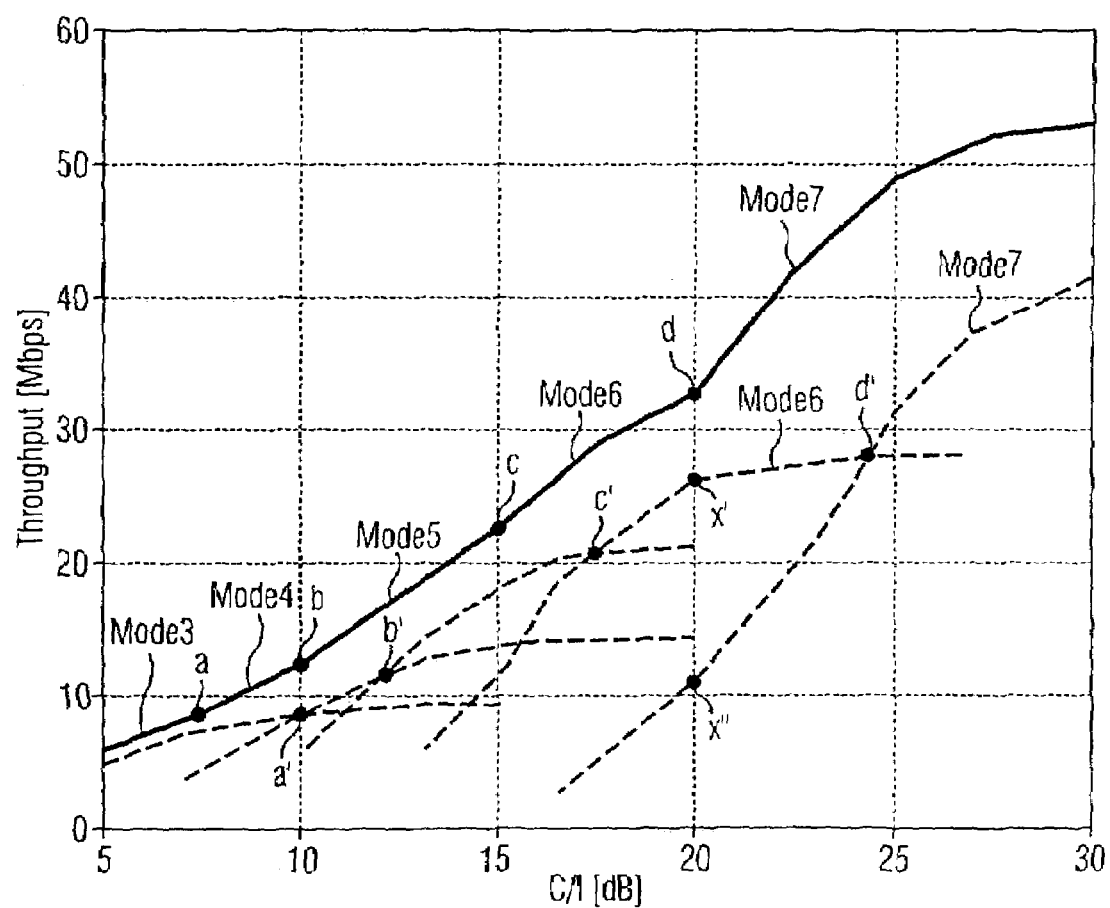

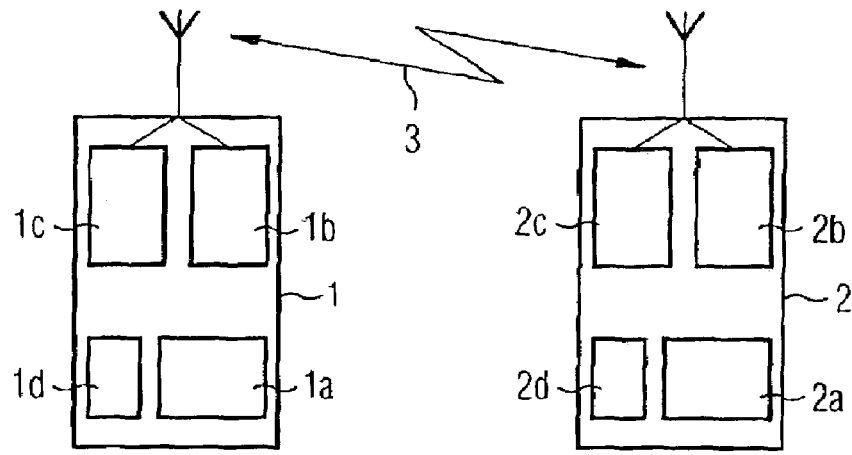
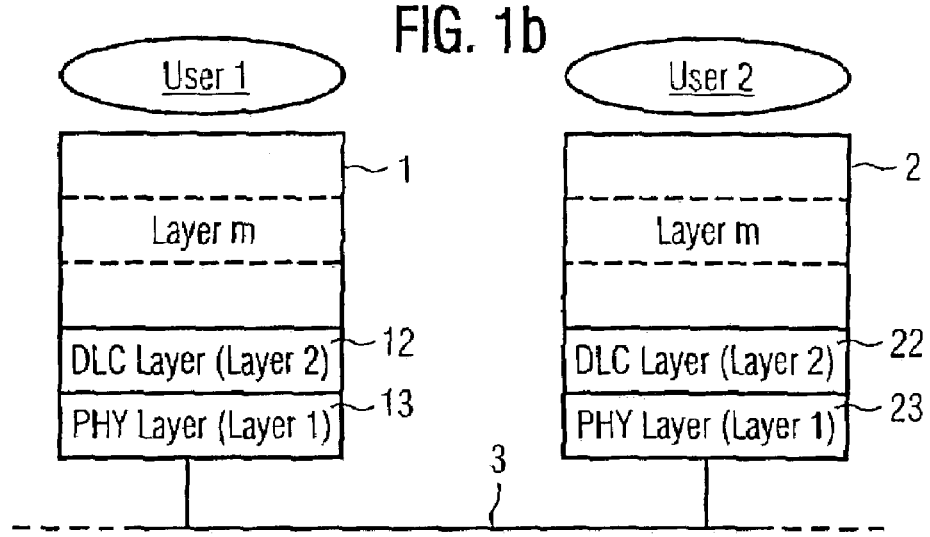
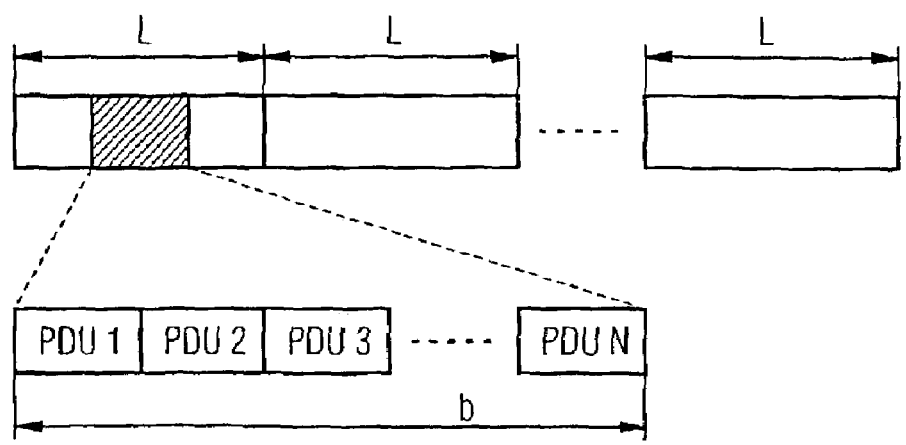

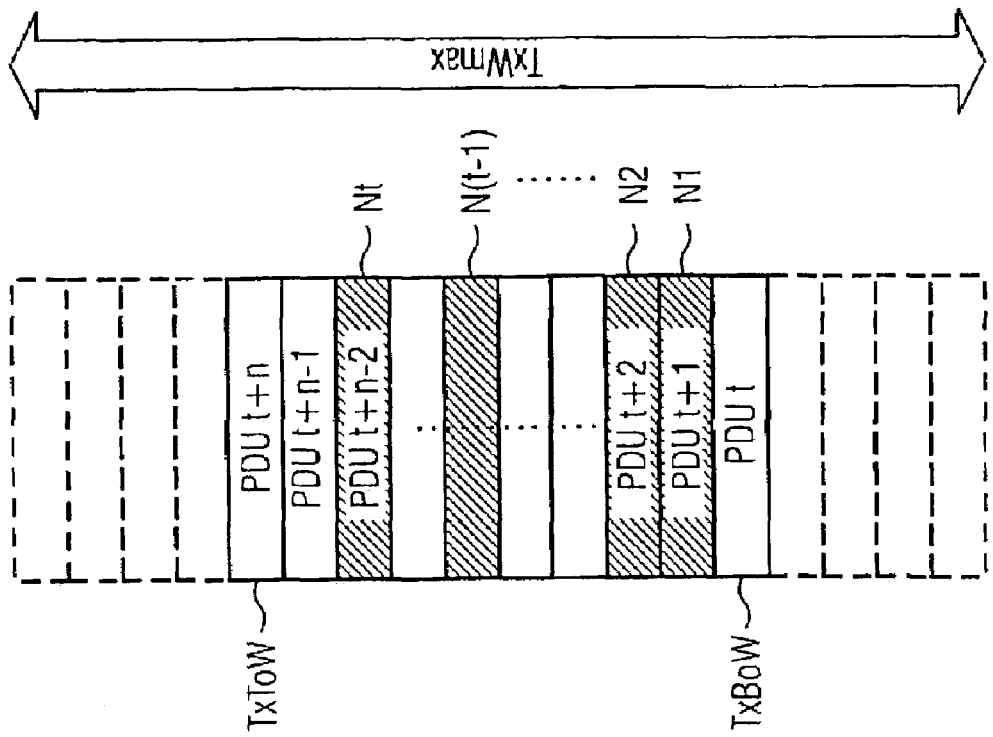
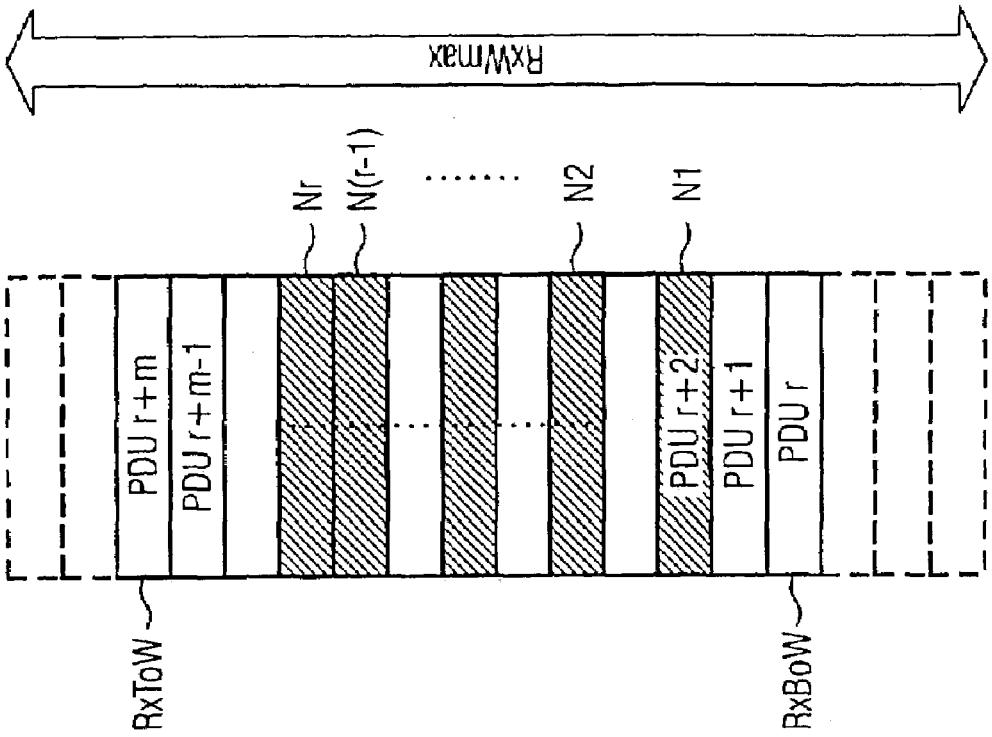

ARQ PARAMETER NEGOTIATION IN A DATA PACKET TRANSMISSION SYSTEM USING LINK ADAPTATION

The present invention relates to a communication system, which transmits data packets. In particular data packets are transmitted with a transmission mode selected from a plurality of available transmission modes in that communication system.

In communication systems, data packets are transmitted over a physical link between different transceivers. Such a structure, as for example standardized by the International Standard Organization (ISO), is the reference model of open data interconnections (OSI) [Bertsekas, Dimitri P.: "Data Networks", $2^{nd}$ ed., Prentice Hall, 1992]. Each transceiver, for transmitting as well as for receiving data packets, is characterized as having several layers, whereas the both lowest layers are the Data-Link-Control-Layer (DLC-Layer or Layer 2 or Convergence Layer) and the Physical-Interface-Layer (PHY-Layer or Layer 1). The Physical-Interface-Layer is the lowest one and provides data packet transmission between the different transceivers over the physical link.

In existing communication systems, different techniques may be employed to transmit data packets between transceivers over the physical link. It is a widely used method to allocate several transmission time periods of a transmission frame to several transceivers. In contrary to wired communication systems, in the wireless communication systems, as for example an EDGE systems, the reliability of data transmission strongly depends on the radio link quality on the physical link. For example burst disturbance in radio link caused by co-channel interference and multi-path fading introduces a drastic variation of the link quality.

As it is known from WO9913304 a selection method for all available transmission modes is described, where a transmission mode is defined as a combination of a coding rate and a modulation scheme. Each combination of a modulation and coding schemes is based on using measured link quality parameters to determine which combination provides the best user quality. Based on Eq.1 it is possible to estimate how a change of modulation or channel coding scheme would effect the user quality, as for example the data throughput $S_i$. Base on this estimation a transmission mode can be selected that provides the best user quality.

$$S_i = R_i * (1 - BLER_i) \quad \text{Eq.1}$$

For each transmission mode i, the maximum data rate $R_i$ and the data block error rate $BLER_i$ are given. Based on this assumption the maximal throughput $T_i$ can be calculated with equation Eq.1 for each transmission mode i. The throughput for all available transmission modes in the system then will be compared. The mode with the maximal throughput is selected as the suitable transmission mode for transmitting the data blocks.

As it is known in wireless communication systems, for example shown in Table 1 [Jamshid Khun-Jush: "Structure and Performance of the HIPERLAN/2 Physical Layer" Procedures VTC'99 FALL, 1999] a coding rate and a modulation scheme is allocated for the wireless data transmission over the physical link in the PHY-Layer of a transmitting transceiver. To decrease the influence of link quality variations on the data transmission, or more detailed onto the link throughput, in today existing wireless communication systems (e.g. HIPERLAN type 2, IS-136 and EDGE), the Physical Layer uses various transmission modes. Such a selection of various transmission modes is often called an adaptation scheme. For example, based on link quality measurements, e.g. the carrier to interference (C/I) ratio, a transmission mode is selected from a list of transmission modes available in that communication system. As a result the link throughput can be maximized, when a combination is selected as a function of the radio link quality.

TABLE 1

| Transmission mode | Modulation scheme | Coding rate | Physical layer bit rate |
|---|---|---|---|
| 1 | BPSK | ½ | 6 Mbps |
| 2 | BPSK | ¾ | 9 Mbps |
| 3 | QPSK | ½ | 12 Mbps |
| 4 | QPSK | ¾ | 18 Mbps |
| 5 | 16QAM | 9/16 | 27 Mbps |
| 6 | 16QAM | ¾ | 36 Mbps |
| 7 | 64QAM | ¾ | 54 Mbps |

For error sensitive services in data transmission systems all transmitted data packets, further also often named as protocol data units (PDU's), have to be correctly received by the receiver. Therefore erroneous transmitted data packets have to be detected and retransmitted by the transmitter again. To detect the erroneous transmitted data packets, binary Cyclic-Redundancy-Check (CRC) codes are increasingly in use. Based on the CRC code result, the receiver notifies the transmitter with an Automatic-Repeat-Request (ARQ) feedback acknowledgment whether the transmitted PDU's have been successfully received or not. The erroneous ones are then retransmitted. In general, three basic retransmission mechanisms, Stop-and-Wait ARQ, Go-back-N (GbN-) ARQ and Selective Repeat (SR-) ARQ, are considered in most data transmission systems. In the case of using SR-ARQ, the PDU's are transmitted continuously. The transmitter re-transmits only those PDU's, which are detected as to be erroneous. Since ordinarily PDU's must be delivered to the user in a correct order, a buffer is provided at the receiving transceiver, to store the error free received PDU's and the number of detected erroneous PDU's. When the first negatively acknowledged PDU is successfully received, the receiver than releases the error-free received PDU's in a consecutive order until the next erroneously received PDU is encountered. In the transmitter the buffer must be provided to store these PDU's which are transmitted until receiving positive acknowledgements. The buffers in the transmitter and receiver are further referred as ARQ-control-window for the transmitter and receiver, respectively.

But in today existing communication systems for transmitting data packets, the ARQ mechanism operates on the DLC layer in a transceiver. This ARQ mechanism is constrained with a limited ARQ control window, due to a limit of processing power, a limit of memory size and a lower protocol overhead. Therefore the transmitter can only send so many PDU's that the ARQ window allows. When the link quality of the physical link is very low, which also results in erroneous transmitted data packets, a lot of PDU's has to be retransmitted. In consequence the buffer of the ARQ control window in the transmitting transceiver could become blocked and the throughput is reduced. In this case the maximal data rate provided by a transmission mode can not be utilized. Therefore equation Eq.1 is not suitable to optimize the data throughput of radio links, Eq.1 shows only what could be achievable in ideal systems.

It is therefore an object of the invention to provide a method that overcomes the problem and thereupon increasing the user quality value of a real communication system.

This is achieved by teaching of claim 1.

In one embodiment, it is advantageous to determine the transmission capacity parameter at least by the maximum data rate $R_{maxi}$ provided in each available transmission mode.

In one embodiment, the state of the automatic repeat request control window is determined by the parameters of the automatic repeat request control window from at least the transmitting transceiver or the receiving transceiver to estimate the throughput of a real system, which especially leads to an optimized overall throughput.

In one embodiment, it is useful to describe the quality value by the user data throughput. The user data throughput then bases on the protocol data unit error rate, the maximal data rate, the transmission capacity and the state of the automatic repeat request control window from at least one transceiver.

Further, it is advantageous to use the novel method for a radio packet data system, where the reliability of data transmission strongly depends on the radio link quality on the physical link, e.g. through the influence of co-channel interference and multi-path fading in the radio link.

In the following the invention will be further described according to the figures and by means of examples. The following figures show:

FIG. 1a: block diagram of a communication system for data transmission with two transceivers;

FIG. 1b: reference model of a communication system for data transmission with two transceivers;

FIG. 2: transmission capacity reserved for the transmitter within a transmission frame.

Figure 3B:
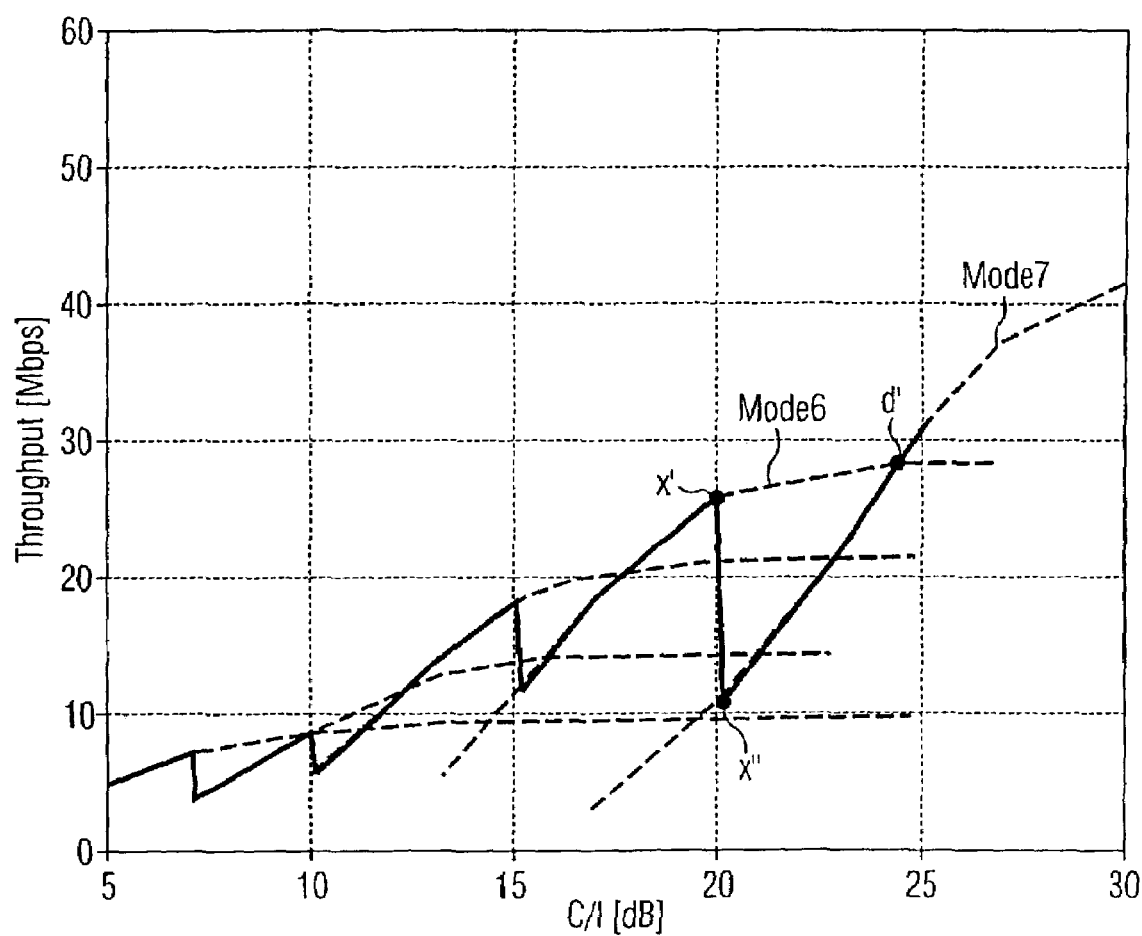
Figure 3C:
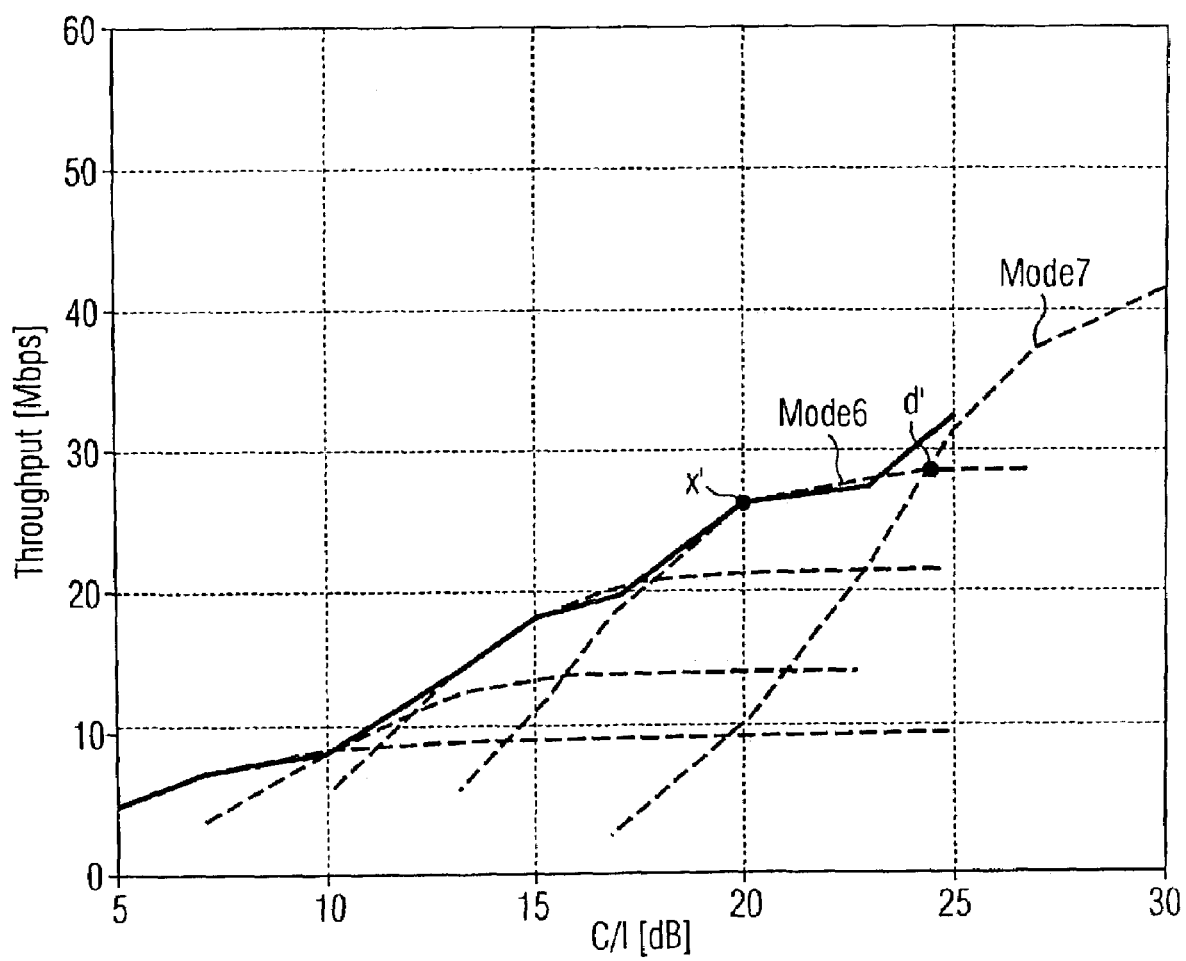
Figure 4:
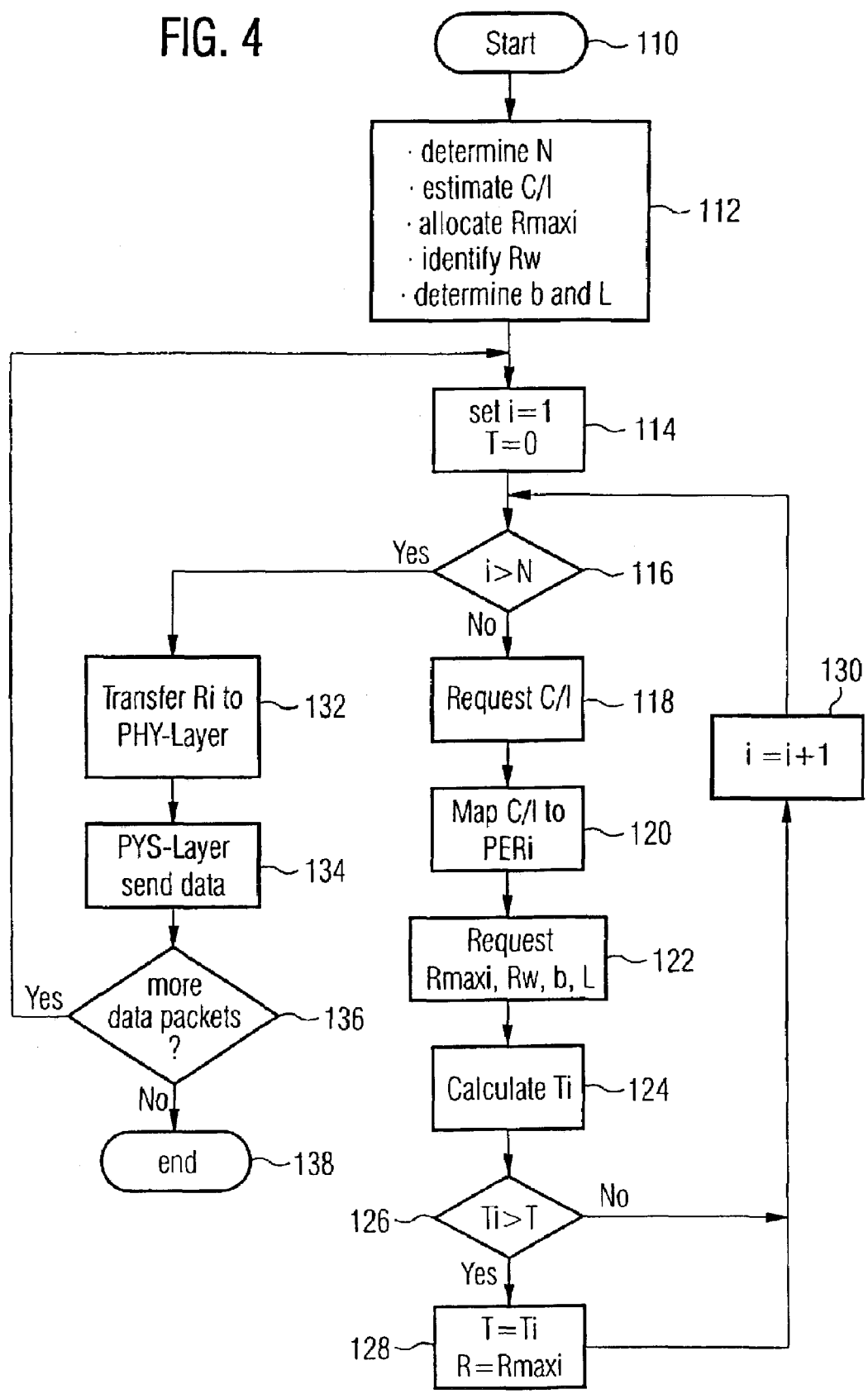

FIG. 3a-c: diagrams of the performance of user quality values under different preconditions;

FIG. 4: flow chart of a transmission mode selection method for data packet transmission;

FIG. 5a: automatic-repeat-request window for a transmitter unit;

FIG. 5b: automatic-repeat-request window for a receiver unit.

FIG. 1a shows schematic a block diagram with two transceivers 1, 2 within a communication system. Both transceivers include a memory part 1a and 2a for storing parameters, a controlling part 1d and 2d, and a receiver part 1b, 2b and a transmitter part 1c, 2c for a radio communication via an air interface 3. As an alternative, FIG. 1b shows a part from the above mention OSI reference model of the same communication system as shown in FIG. 1a with these two transceivers 1 and 2, usable for transmitting and receiving data packets via the air interface which is named as the physical link 3 in the context of this reference model. Based on FIG. 1b, the invention will be further described, where a user1 uses the transceiver 1 as a transmitter and a user2 uses the transceiver 2 as a receiver. The transmitter 1 includes a DLC-Layer 12 for transforming data from a higher Layer m into protocol data units PDU for the transmission. The DLC-Layer 12 includes an ARQ-control-window for a feedback acknowledgment to control the correct transmission of the PDU's. The PHY-Layer 13 provides different coding and modulation schemes for the transmission of the data packets over the wireless physical link 3. The data packets are transmitted over the physical link 3 in transmission frames L, as shown in FIG. 2. Each transmission frame L includes several consecutive data packets $PDU_1$-$PDU_N$ within a time slot b.

The physical layer 13 provides different coding and modulation schemes to overcome the above described problem causes from the variations of link quality. A method for selecting one transmission mode out of a group of available transmission modes is provided at least in one of the transceivers 1 and 2. Together with the link quality parameter from the physical link 3 the user quality for each transmission mode can be estimated.

FIG. 5a and FIG. 5b show the automatic-repeat-request-control-windows for the transmitter 1 and the receiver 2, which have in contrary to assumptions in the prior art a limited size. The negotiated maximum ARQ-control-window sizes in the transmitter 1 and receiver 2 are defined as TxWmax and RxWmax respectively. For both ARQ-control-windows, an upper border TxToW and RxToW and a lower border TxBoW and RxBoW are determined. The upper borders are determined through the sequence numbers of the latest transmitted and correctly received data packets PDU t+n and PDU r+m. The lower borders are determined through the sequence numbers of the oldest not acknowledged and not correctly received data packets PDU t and PDU r.

As will be mentioned again the existing state of the art solutions estimates the throughput only on the base of the maximum data rate and the data block error rate. Therefore it could be assumed that limitations of a ARQ control windows, which normally occurs in real systems are not regarded. The overall throughput in a real system is lower as in the idealized system, due to transmission overheads and limited ARQ-control-windows. In FIG. 3a the performance of a real system is shown in comparison to that one of assuming ideal conditions. The solid line shows for the transmission modes Mode 3 to Mode 7 the ideal performance of the overall throughput under the conditions of unlimited ARQ windows, whereas the dashed lines show, for the same transmission modes Mode 3 to Mode 7, the real performance of the throughput by regarding the limited ARQ-window. Wherein the dashed lines in FIG. 3a shows the complete throughput for all transmission modes, the solid line is the sum of parts of the throughput for different transmission modes, named as the overall throughput. As a function of the carrier to interference ratio C/I one of the transmission modes Mode3 to Mode 7 is selected, depending from which mode a higher throughput can be achieved. Point a to d represents the equivalent C/I-values, where a transmission mode has to change under ideal conditions, whereas point a' to d' are the real points for changing between different modes. In that regard a performance loss in the overall throughput causes in the real system, as shown in FIG. 3b occurs, if the selection of the physical transmission mode is performed in terms of the idealized throughput curve. For example, the idealized curve shows that the transmission mode has to be changed from transmission mode Mode 6 to Mode 7 at point d, when the C/I-ratio is larger than 20 dB. But the real curve shows that the mode 7 is recommended at point d', if C/I is larger than 24 dB. Thus the system prepares a reversal at 20 dB which results in a reduction of throughput from point x' to x'' at the 20 dB point. In total a throughput loss in the real system is caused for C/I values between 20 dB and 24 dB, as can be seen in FIG. 3b. There the best achievable throughput is following the dashed line from point x' to d', whereas the state of the art solution following the solid line from point x' to point d' via the point x''. In FIG. 3b it is obviously that a reduction of the overall throughput also occur after the points a-c.

The preferred method for a selection of a transmission mode, out of all available transmission modes, will be further described in more detail by explanation of the flow chart in FIG. 4. The selection of a transmission mode can be done either in the transmitter 1 or the receiver 2. When the selection is performed in the receiver, the selected mode should be transmitted to the transmitter, which then uses the selected mode for transmission the data packets. After starting the process with step 110, in a first step 112 several preconditions have to be set. The total number N of all available transmission modes in that communication system is determined and to each of them a transmission parameter Rmaxi and an estimated link quality parameter C/I are allocated. Also the transmission time b reserved for the transmitter and the duration L of the transmission frames is determined. Further the state of the ARQ-control-window from at least one transceiver is identified. Thereafter, in step 114, the flow parameter i for the following loop is set to i=1 and the value for the throughput to T=0. In the decision box 116 that value i has to be compared with the above determined N. If i<N the following loop 116-130 is running. Therefore in the first step 118 of the loop, the C/I is requested from the memory 112 and then 120 mapped to PDU error rate for the transmission mode i. Then, in step 122, the transmission parameter $R_{maxi}$, the reserved transmission time b, the duration of the transmission frame L and the state of the ARQ-control-window $R_w$ is read from the corresponding memories 112. As a result of the next step 124 the user quality value is estimated, e.g. the throughput is estimated under the premise of equation Eq.2, which will be later described in more detail. In the next two steps 126 and 128 there is an update of the throughput T to $T_i$, and the transmission parameter R is updated to Rmaxi, if the throughput $T_i$ for the actual transmission mode i is higher than any former T. Then i is countered by i+1 and the loop works again for the next available transmission mode, until i is larger than N. If the condition T>N is fulfilled, in step 132 the parameter list for T and R is read from the memory and delivered to the physical layer of the transmitting transceiver 1. The physical layer then choose the transmission mode, which has the maximum data rate R and uses it for the data transmissions in the next transmission frame 134. Finally the process can be restarted for sending further data packets 138 and for example after a predetermined delay time or after detecting that the parameters used in equation 2 have been significantly changed. Else where the process is finished 138.

The main step 124 of the preferred method for selecting a transmission mode is now described in more detail. In this selection method the data throughput of each transmission mode i is calculated based on equation Eq.2:

$$T_i = \text{Min}\{R_w, R_{max,i} * b/L\} * (1-PER_i) \qquad \text{Eq.2}$$

Where $T_i$ is the data throughput for the transmission mode i and $PER_i$ is the PDU error rate for the transmission mode i at the considered radio link quality. $R_{max,i}$ means the maximal data rate of the physical transmission mode i, and $R_w$ represents the state of the ARQ window either in the receiver or in the transmitter unit, promised on the DLC layer. b the transmission time reserved for a transceiver for transmitting data packets within a transmission frame length L. The value of $R_{max,i} * b/L$ represents the transmission capacity for a transmission mode i.

It is the advantageous feature of the invention to follow the state of the ARQ-control-window either in the receiver or the transmitter by estimation the term $\text{Min}\{R_w, R_{max,i} * b/L\}$ in Eq.2, where the maximal data rate promised $R_w$ on the DLC layer must be estimated based on ARQ-control-window fullness and ARQ acknowledgements.

The estimation of the state of the automatic-repeat-request-control-window leads to the achievable data rate $R_w$ as will be now described for the two alternative preferred embodiments.

In the first embodiment the state of the ARQ-control-window in the transmitter 1 will be gathered to determine the maximum data rate of the DLC-Layer 12. On the DLC-Layer of the transmitter 1 data packets from higher layers m must be reconstructed to Protocol Data Units (PDU) with sequence numbers t before transmission. The ARQ-control-window in the transmitter is normally used to control PDU retransmissions. The ARQ-control-window size TxWmax is the maximal number of PDU's that have been transmitted and are waiting for acknowledgements from the receiver 2. The bottom of the ARQ-control-window TxBoW is the oldest sequence number not yet acknowledged by the receiver 2. The top of the ARQ-control-window TxToW is the newest sequence number not yet acknowledged by the receiver 2. The number of PDU's to be retransmitted Nt in the ARQ-control-window can be determined after receiving acknowledgements. Therefore the maximum data rate on the DLC layer in the transmitter can be estimated with:

$$R_w = (N_r + Tx W\max + TxBoW - TxToW)/L \qquad \text{Eq.3}$$

The second embodiment takes into account the state of the ARQ-control-window from the DLC-Layer 22 in the receiver 2. Here the ARQ-control-window is normally used to buffer a number of PDU's that are not received in order and to deliver the PDU's in sequence to the higher layers. The ARQ-control-window size RxWmax is the maximal interval of sequence numbers that are eligible for reception. The bottom of the ARQ-control-window RxBoW is the oldest sequence number expected by the receiver. The top of the ARQ-control-window RxToW is the newest sequence number received by the receiver. The number Nr of PDU's to be retransmitted in the ARQ-control-window can be countered based on PDU's lacked between RxBoW and RxToW. So the maximum data rate promised on the DLC layer in the receiver can be estimated with:

$$R_w = (N_r + Rx W\max + RxBoW - RxToW)/L \qquad \text{Eq.4}$$

Finally in FIG. 3c the simulated results of the overall throughput by using one of the preferred embodiments are shown. If the C/I value reaches point x' the transmission mode Mode 6 will not change to Mode 7, the system first changes to mode 7 close to point d' when using the preferred embodiment on the base of equation Eq.2.

As already outlined, the comparing of FIG. 3b with FIG. 3c an improvement of the overall throughput can be recognized by using the equation Eq.2 under the premiss of the state of the ARQ-control-window from the receiver 1 or the transmitter 2. It is distinct that the selection criterion based on equation (2) is more reliable than that using equation (1) and guarantees the best throughput of the system in different radio link qualities (C/I).

Thus, the present invention increases the overall throughput of a transmission system and leads to an optimized system with best performance. In the following a preferred embodiment of a transceiver for transmitting and/or receiving data packets over a physical link in a communication system is briefly described, where the above described method is implemented. A controlling part 1d, 2d, as shown in FIG. 1a, is needed at least in one transceiver, to perform the selection method, as for example described in FIG. 4. That transceiver integrates a calculator for calculating a channel parameter based on the link quality and a determinator for determining a transmission capacity parameter for each available transmission mode i. An identifer for identifing the state of a automatic repeat request control window in that transceiver is included. Although the controlling part includes an estimator for estimating user quality value for each available transmission mode based on the channel parameter, the transmission capacity parameter and the state of the automatic repeat request control window from at least one transceiver. Finally the controlling part includes a selector for selecting a transmission mode that provides the best user quality value. The above described controlling part $1d$, $2d$ is used as a synonym for all kind of hardware, that can be used in mobile terminals for data processing and controlling purposes. Therefore general purpose processing devices like so called micro processors, dedicated programmable hardware like so called digital signal processors as well as hardware programmable logic circuits like Application Specific Integrated Circuits (ASICs) should be covered by the term processing device. Due to certain constraints like computing power, integration size, availability etc. up to now it was common to distribute functions like processing and controlling to more than one device. Therefore a person skilled in the state of the art should be aware that processing device also means a set or any combination of microprocessors, digital signal processors, ASIC's etc.

Furthermore it has be mentioned again that the invention is not restricted to the specific embodiments and examples described in the present invention. That means, that the above described method can implemented in any data packet transmission system, where the above described problems can be solved by regarding the influence of the real ARQ-control-window size from at least the transmitting or receiving transceiver. That is, on the basis of the teaching contained in the description, various modifications and variations of the invention may be carried out.

The invention claimed is:

1. A method for transmitting data packets between two transceivers in a communication system, wherein a transmission mode for transmitting the data packets is selected from a plurality of available transmission modes and an automatic repeat request for retransmission is used, comprising the steps of:
   calculating, for each available transmission mode, a channel parameter based on the link quality;
   determining, for each transmission mode, a transmission capacity parameter;
   identifing a state of an automatic repeat request control window for at least one transceiver;
   estimating a user quality value for each available transmission mode based on the channel parameter, the transmission capacity parameter, and the state of the automatic repeat request control window from at least one transceiver; and
   selecting a transmission mode of the plurality of available transmission modes, the selected transmission mode providing the best user quality value;
   wherein the transmission capacity parameter is determined by a maximal data rate ($R_{maxi}$) provided in each available transmission mode, a transmission (b) and transmission frame (L) length provided for transmitting data packets.

2. The method of claim 1, wherein the channel parameter for each available transmission mode is a protocol data unit error rate ($PER_i$).

3. The method of claim 1, wherein, in a transceiver that transmits data packets, the state of the automatic repeat request control window $R_w$ is determined by an oldest protocol data unit sequence number TxBoW, a newest protocol data unit sequence number TxToW and a number of data packets Nt in a window to be retransmitted.

4. The method of claim 1, wherein, in a transceiver that receives data packets, the state of the automatic repeat request control window $R_w$ is determined by an oldest protocol data unit sequence number RxBoW expected by a receiver unit, a newest protocol data unit sequence number RxToW received by the receiver unit and a number of data packets Nr in a window to be retransmitted.

5. A method for transmitting data packets between two transceivers in a communication system, wherein a transmission mode for transmitting the data packets is selected from a plurality of available transmission modes and an automatic repeat request for retransmission is used, comprising the steps of:
   calculating, for each available transmission mode, a channel parameter based on the link quality;
   determining, for each transmission mode, a transmission capacity parameter;
   identifing a state of an automatic repeat request control window for at feast one transceiver;
   estimating a user quality value for each available transmission mode based on the channel parameter, the transmission capacity parameter, and the state of the automatic repeat request control window from at least one transceiver; and
   selecting a transmission mode of the plurality of available transmission modes, the selected transmission mode providing the best user quality value;
   wherein the user quality value for each available transmission mode is described by a corresponding user data throughput ($T_i$) for that transmission mode; and,
   wherein the step of estimating the user data throughput ($T_i$) is based on a protocol data unit error rate ($PER_i$), a maximal data rate ($R_{maxi}$), a transmission time b and transmission frame length L, and the state of the automatic repeat request control window ($R_w$) from at least one transceiver.

6. A transceiver having a controlling part, the controlling part comprising:
   means for calculating a channel parameter based on a link quality;
   means for determining a transmission capacity parameter for each of a plurality of available transmission modes;
   means for identifying a state of an automatic repeat request control window in at least one transceiver;
   means for estimating a user quality value for each available transmission mode based on the channel parameter, the transmission capacity parameter and the state of the automatic repeat request control window from at least one transceiver; and
   means for selecting a transmission mode of the plurality of available transmission modes, the selected transmission mode providing the best estimated user quality value;
   wherein the transmission capacity parameter is determined by a maximal data rate ($R_{maxi}$) provided in each available transmission mode, a transmission time b and transmission frame length L provided for transmitting data packets.

7. The transceiver according to claim 6, wherein the transceiver is part of a radio packet data system.

8. The transceiver of claim 6, wherein the channel parameter for each available transmission mode is a protocol data unit error rate ($PER_i$).

9. The transceiver of claim 6, wherein, the state of the automatic repeat request control window ($R_w$) is determined by an oldest protocol data unit sequence number TxBoW, a newest protocol data unit sequence number (TxToW), and a number of data packets (Nr) in a window to be retransmitted.

10. The transceiver of claim 6, wherein the state of the automatic repeat request control window ($R_w$) is determined by an oldest protocol data unit sequence number (RxBoW) expected by a receiver unit, a newest protocol data unit sequence number (RxToW) received by the receiver unit, and a number of data packets Nr in a window to be retransmitted.

11. The transceiver according to claim 6, wherein the user quality value for each available transmission mode is described by a corresponding user data throughput ($T_i$) for that transmission mode.

* * * * *

UNITED STATES PATENT AND TRADEMARK OFFICE
CERTIFICATE OF CORRECTION

PATENT NO.       : 7,266,086 B2
APPLICATION NO.  : 10/239035
DATED            : September 4, 2007
INVENTOR(S)      : Li It is certified that error appears in the above-identified patent and that said Letters Patent is hereby corrected as shown below:

In Column 3, Lines 3-4, below "communication system." delete "This is achieved by teaching of claim 1.".

In Column 5, Line 35, delete "T>N" and insert -- I>N --, therefor.

In Column 6, Line 50, delete "premiss" and insert -- premise --, therefor.

In Column 7, Line 59, in Claim 1, insert -- time --, before "(b)".

In Column 7, Line 60, in Claim 1, delete "(L) length" and insert -- length (L) --, therefor.

In Column 7, Line 67, in Claim 3, delete "$R_w$" and insert -- $(R_w)$ --, therefor.

In Column 8, Line 1, in Claim 3, delete "TxBoW" and insert -- (TxBoW) --, therefor.

In Column 8, Line 2, in Claim 3, delete "TxToW" and insert -- (TxToW) --, therefor.

In Column 8, Line 3, in Claim 3, delete "Nt" and insert -- (Nt) --, therefor.

In Column 8, Line 6, in Claim 4, delete "$R_w$" and insert -- $(R_w)$ --, therefor.

In Column 8, Line 7, in Claim 4, delete "RxBoW" and insert -- (RxBoW) --, therefor.

In Column 8, Line 9, in Claim 4, delete "RxToW" and insert -- (RxToW) --, therefor.

In Column 8, Line 10, in Claim 4, delete "Nr" and insert -- (Nr) --, therefor.

In Column 8, Line 22, in Claim 5, delete "feast" and insert -- least --, therefor.

In Column 8, Line 37, in Claim 5, delete "b" and insert -- (b) --, therefor.

In Column 8, Line 38, in Claim 5, delete "L" and insert -- (L) --, therefor.

In Column 8, Line 60, in Claim 6, delete "b" and insert -- (b) --, therefor.

UNITED STATES PATENT AND TRADEMARK OFFICE
CERTIFICATE OF CORRECTION

PATENT NO. : 7,266,086 B2
APPLICATION NO. : 10/239035
DATED : September 4, 2007
INVENTOR(S) : Li It is certified that error appears in the above-identified patent and that said Letters Patent is hereby corrected as shown below:

In Column 8, Line 61, in Claim 6, delete "L" and insert -- (L) --, therefor.

In Column 9, Line 3, in Claim 9, delete "TxBoW" and insert -- (TxBoW) --, therefor.

In Column 9, Line 5, in Claim 9, delete "(Nr)" and insert -- (Nt) --, therefor.

In Column 10, Line 2, in Claim 10, delete "Nr" and insert -- (Nr) --, therefor.

Signed and Sealed this

Fifteenth Day of July, 2008

JON W. DUDAS
*Director of the United States Patent and Trademark Office*